United States Patent
Nakata et al.

(10) Patent No.: US 9,331,960 B2
(45) Date of Patent: May 3, 2016

(54) COMMUNICATION SYSTEM, COMMUNICATION DEVICE, STORAGE MEDIUM, AND COMMUNICATION METHOD

(71) Applicant: NINTENDO CO., LTD., Kyoto (JP)

(72) Inventors: Tetsuya Nakata, Kyoto (JP); Haruki Tojo, Kyoto (JP); Jun Ito, Kyoto (JP); Masashi Mifune, Kyoto (JP); Tomohiro Nishino, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 164 days.

(21) Appl. No.: 14/161,943

(22) Filed: Jan. 23, 2014

(65) Prior Publication Data

US 2015/0092784 A1 Apr. 2, 2015

(30) Foreign Application Priority Data

Oct. 2, 2013 (JP) .................................. 2013-207626

(51) Int. Cl.
| | |
|---|---|
| *H04L 12/947* | (2013.01) |
| *H04L 29/08* | (2006.01) |
| *H04L 12/727* | (2013.01) |
| *H04L 12/721* | (2013.01) |
| *H04L 12/733* | (2013.01) |

(52) U.S. Cl.
CPC .............. *H04L 49/25* (2013.01); *H04L 45/121* (2013.01); *H04L 45/127* (2013.01); *H04L 45/20* (2013.01); *H04L 67/104* (2013.01)

(58) Field of Classification Search
None
See application file for complete search history.

(56) References Cited

U.S. PATENT DOCUMENTS

| 2007/0053295 | A1 | 3/2007 | Cleveland et al. |
| 2007/0066315 | A1 | 3/2007 | Kado |
| 2010/0131670 | A1* | 5/2010 | Ishii ................. H04L 47/10 709/233 |
| 2013/0195001 | A1* | 8/2013 | Liu ..................... H04L 69/04 370/312 |
| 2014/0029415 | A1* | 1/2014 | Osterloh ......... H04L 41/0668 370/221 |

FOREIGN PATENT DOCUMENTS

| JP | 2007-74564 | 3/2007 |
| WO | 2013/100752 | 7/2013 |

OTHER PUBLICATIONS

Partial European Search Report (5 pgs.) dated Mar. 19, 2015 issued in corresponding European Application No. 14152090.8.
European Search Report (9 pages) dated Jul. 8, 2015, issued in corresponding European Application No. 14152090.8.

* cited by examiner

*Primary Examiner* — Kodzovi Acolatse
(74) *Attorney, Agent, or Firm* — Nixon & Vanderhye P.C.

(57) ABSTRACT

An example communication system, including: a plurality of devices that form a mesh-type network, each of the plurality of devices performing communication from a source device to a destination device, directly or by relaying via one or more other devices, and at least one of the plurality of devices including a selecting unit, that selects a communication route from the source device to the destination device according to a first restriction with regard to a relay value indicative of the number of communication routes that each device is able to relay.

26 Claims, 10 Drawing Sheets

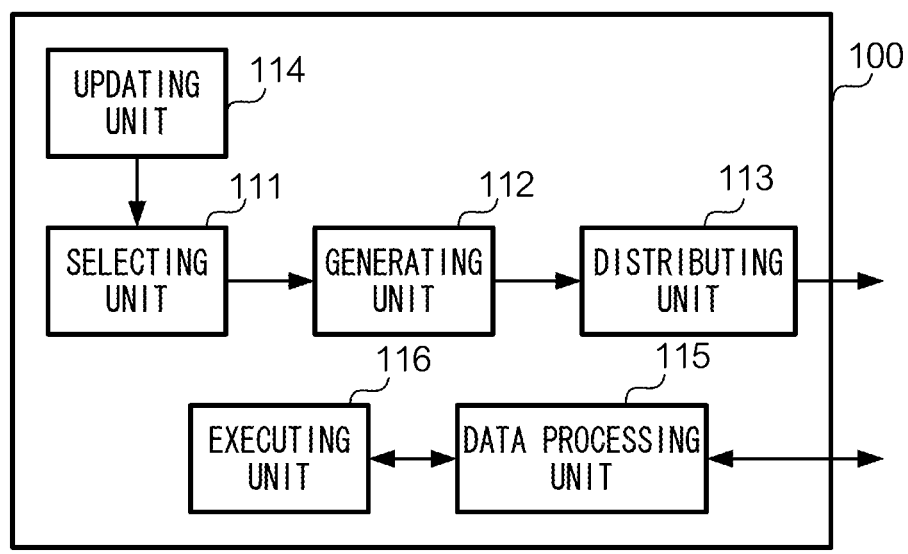
FIG. 4
FIG. 5
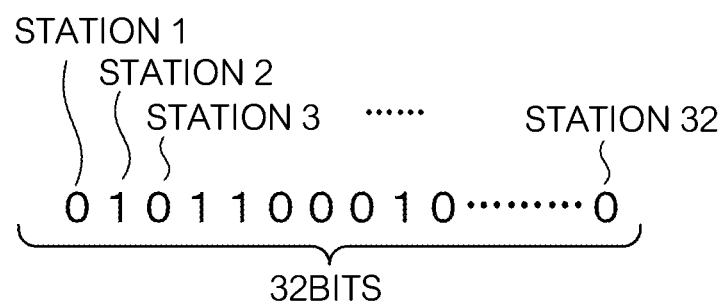
FIG. 6

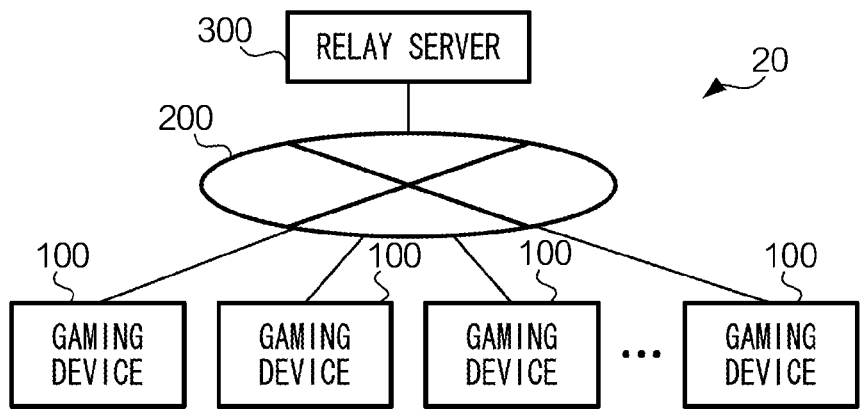
FIG. 19
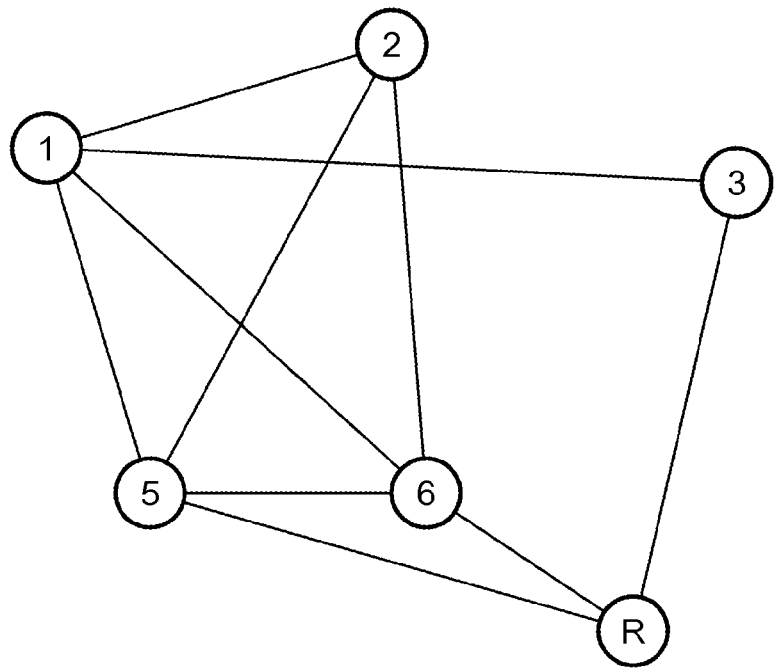
FIG. 20
| | DESTINATION | | | | |
|---|---|---|---|---|---|
| | | 1 | 2 | 3 | 5 | 6 |
| SOURCE | 1 | | 2 | 3 | 5 | 6 |
| | 2 | 1 | | 1 | 5 | 6 |
| | 3 | 1 | 1 | | R | R |
| | 5 | 1 | 2 | R | | 6 |
| | 6 | 1 | 2 | R | 5 | |
FIG. 21

US 9,331,960 B2

COMMUNICATION SYSTEM, COMMUNICATION DEVICE, STORAGE MEDIUM, AND COMMUNICATION METHOD

CROSS REFERENCE TO RELATED APPLICATIONS

The disclosure of Japanese Patent Application No. 2013-207626, filed on Oct. 2, 2013, is incorporated herein by reference.

FIELD

The technique described herein relates to data communication among devices using a mesh-type network.

BACKGROUND AND SUMMARY

There is known in the art a technique of setting a route in a wireless mesh network having plural wireless stations, including steps of acquiring one or more routes to be selected based on a number of hops, and selecting a route based on consumption of wireless resource and delay amount if acquired plural routes.

According to one aspect of the technique, there is provided a communication system, including: a plurality of devices that form a mesh-type network, with each of the plurality of devices performing communication via a source device to a destination device, directly or indirectly by relay through one or more other devices, with at least one of the plurality of devices including a selecting unit that selects a communication route from the source device to the destination device according to a first restriction set in relation to a relay value indicative of a number of communication routes through which each device is able to relay.

BRIEF DESCRIPTION OF THE DRAWINGS

FIG. 4 shows an example of a non-limiting relay route table.

FIG. 5 is a block diagram showing an example of a non-limiting functional configuration of the gaming device.

FIG. 6 shows an example of a non-limiting data structure of address information.

FIG. 19 is a block diagram showing another example of a non-limiting configuration of a communication system (second exemplary embodiment).

FIG. 20 shows an example of a non-limiting network configuration including a relay server.

FIG. 21 shows an example of a non-limiting relay route table.

DETAILED DESCRIPTION OF NON-LIMITING EXEMPLARY EMBODIMENTS

1. Exemplary Embodiments

First Exemplary Embodiment

Figure 1:
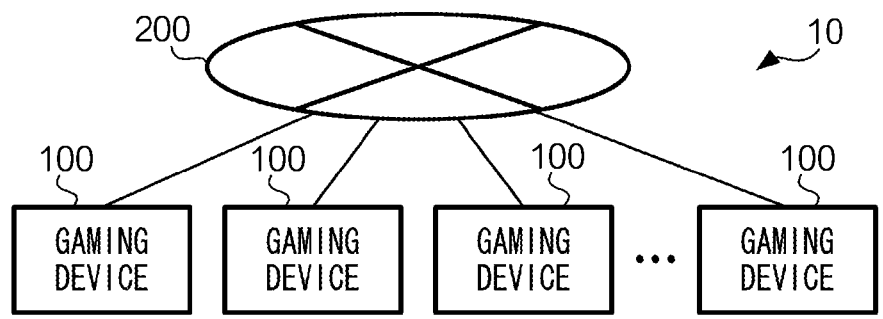
FIG. 1 is a block diagram showing an example of a non-limiting configuration of a communication system (first exemplary embodiment).

FIG. 1 is a block diagram showing a configuration of communication system 10 according to an exemplary embodiment. Communication system 10 is a system that enables plural users to play a game. Communication system 10 includes plural gaming devices 100 and network 200.

Network 200 may be, for example, the Internet. Alternatively, network 200 may be a network configured differently from the Internet, such as a cellular network. Moreover, network 200 may be a communication network for interconnecting gaming devices 100, which network covers a certain area for interconnecting gaming devices 100 of proximate users. However, network 200 may be a communication network for interconnecting users all around the world, without any local restrictions. Furthermore, communication between network 200 and gaming device 100 may be conducted via wired or wireless communication.

Gaming device 100 is a computer device for playing a game, and is one example of a communication device of the present technique. Each of gaming devices 100 is used by a different user. Gaming device 100 may be a handheld gaming device, or a home-use video game console. In addition, gaming device 100 consists of a single apparatus or a combination of multiple apparatuses (such as an input device, a display device, and a main device). Here, the number of gaming devices 100 is not limited; however, it may be limited according to a game played by users. However, it is noted that to form a mesh-type network described below a minimum of 3 gaming devices 100 is required.

Figure 2:
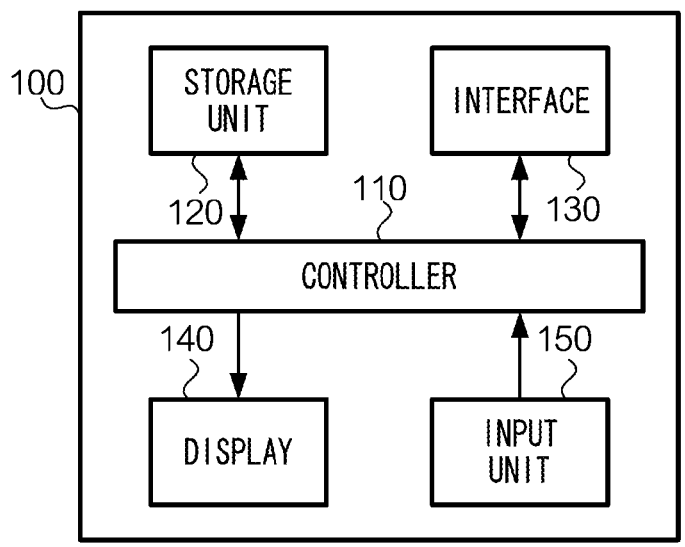
FIG. 2 is a block diagram showing an example of a non-limiting hardware configuration of a gaming device.

FIG. 2 is a block diagram showing a hardware configuration of gaming device 100. Gaming device 100 includes controller 110, storage unit 120, interface 130, display 140, and input unit 150. Although not shown in FIG. 2, gaming device 100 may include a speaker and a microphone (or interfaces thereof). Gaming devices 100 need not necessarily each have the same configuration, as long as they each include components necessary for implementing the present technique.

Controller 110 is a unit for controlling operations of components of gaming device 100. Controller 110 is also a unit for controlling communication with other gaming devices 100 via network 200. Specifically, controller 110 includes a processor such as a CPU (Central Processing Unit) and a main memory, and executes programs to control operations of the components. The programs include an application program for controlling communication with other gaming devices 100 (hereinafter referred as a "communication control program") and an application program for executing a game (hereinafter referred to as a "game program").

Storage unit 120 is a unit for storing data. Specifically, storage unit 120 includes a storage medium such as a flash memory or a hard disk. Storage unit 120 may include a data reader/writer of a detachable storage medium such as an optical disk. The detachable storage medium may store the game program. Storage unit 120 may store programs and a relay route table described below.

Interface 130 is a unit used for exchanging data. Specifically, interface 130 includes a communication chip for modulating and demodulating data using a modulation/demodulation system corresponding to network 200. Interface 130 transmits data provided by controller 110, and receives data transmitted.

Display 140 is a unit used for displaying information. Specifically, display 140 includes a display panel composed of display elements such as liquid crystal elements or electroluminescence elements and a driver circuit for the display panel, which panel displays an image according to image data provided by controller 110. It is noted that the image herein may be a still image or a moving image.

Input unit 150 is a unit for receiving operations input by a user. Input unit 150 includes, for example, plural keys (keypad) and provides controller 110 with data corresponding to a depressed key. Input unit 150 may include a touch screen configured to correspond to the display panel of display 140, and an input device (or an interface to an input device) such as a mouse, a keyboard, and a joystick. Moreover, input unit 150 may detect operations (motions) of a user by such means as an infrared sensor, an acceleration sensor, or a gyroscope.

By the configuration described above, a game is executed in communication system 10, which plural users can play simultaneously. At the time, each of gaming device 100 executes the above game program at one time. The game available in communication system 10 is not limited, for example, which may be a game for competing with users or for playing cooperatively with users. A genre of the game may be role-playing, action, racing, puzzle, or board game.

In communication system 10, when the game played by plural users simultaneously is executed, a mesh-type network is formed by plural gaming devices 100. The mesh-type network is a P2P (peer to peer) network. Gaming devices 100 constituting the network may vary depending on the game program to be executed or on other circumstances. There may be not only one mesh-type network, but also plural mesh-type networks in communication system 10.

Figure 3:
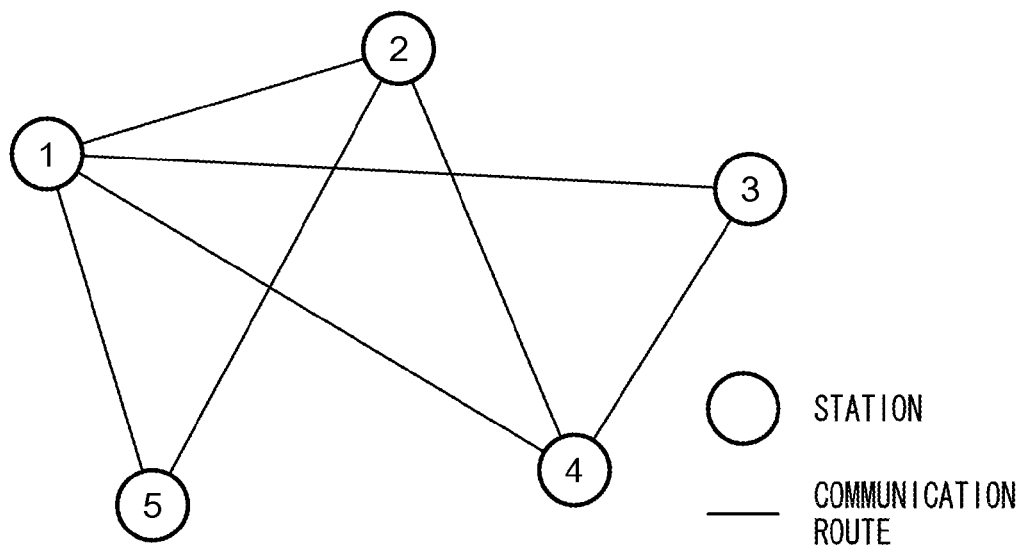
FIG. 3 shows an example of a non-limiting network topology of a mesh-type network.

FIG. 3 shows an example of a network topology of the mesh-type network according to the exemplary embodiment. The example is a network formed by 5 gaming devices 100. Hereinafter, gaming device 100 corresponding to a node of the mesh-type network will be referred to as a "station," and each station is identified by its ID (station ID). In FIG. 3, the network is configured by 5 stations whose station IDs are "1" to "5." A station whose station ID is "n" will be hereinafter referred to as "station n."

Each station (node) has a route (link) to one or more other stations. For example, station 1 in FIG. 3 has links to each of stations 2 to 5. In this case, station 1 is able to communicate with stations 2 to 5 directly (that is, without passing through any other station). Hereinafter, communication without passing through any other station will be referred to as "direct connection."

On the other hand, for example, station 2 does not have a direct link to station 3, despite having direct links to stations 1, 4, and 5. In this case, station 2 exchanges data with station 3 by passing through one or more other stations. Hereinafter, communication by passing through one or more other stations will be referred to as a "relay." Moreover, a station performing a relay will be referred to as a "relay station," and communication via one or more relay stations will be referred to as a "relay connection." A communication route using a relay connection is configured by plural links. On the other hand, a communication route using a direct connection is configured by a single link.

As described in FIG. 3, there may be plural communication routes between two stations. In such a case, an upstream communication route and a downstream communication route are not necessarily the same route. For example, a downstream communication route (1 to 3) between stations 1 and 3 may be a direct connection and an upstream communication route (3 to 1) may be a relay connection via station 4.

The above mesh-type network is formed when a game played simultaneously by plural users is executed in communication system 10. Hereinafter, the mesh-type network formed in such a way (and stations included in the network) will be referred to as a "session." A session is formed in accordance with execution of a game and dissolved at an appropriate timing such as at the end of the game. In communication system 10, sessions are formed and dissolved as needed.

Forming of a session starts with an operation input by any user of gaming devices 100 in communication system 10. For example, while playing a game playable with plural users, a user can recruit one or more opponents or allies, or propose a specific user to play the game with. Forming of a session begins at the station of the user. Hereinafter, such a station will be referred to as a "master," and a station that is not a master during a session will be referred to as a "client." In the exemplary embodiment, any station can be a master. That is, a master is not limited to a specific station.

When a station becomes a master, the master communicates with other stations that are to participate in a session, and selects a communication route to be used for communication between stations from one or more communication routes to be selected. After selecting the communication route, the master records route information. Route information is information on a communication route of stations. When the master has generated route information with regard to all stations participating in the session, the master distributes data on a selected communication route to each station. The data to be distributed will be hereinafter referred to as a "relay route table." A relay route table is a data set including route information. A relay route table is data indicative of communication routes used for communication in a session. Such data is described as tabular data here for convenience of explanation; however, the data is not necessarily tabular data.

FIG. 4 shows an example of a relay route table. The table shown in FIG. 4 is an example of a table in a case where the session shown in FIG. 3 is formed. This table indicates a station ID of the station to which a station that is a source device (or a relay station) should transmit data. Accordingly, a station ID described in the relay route table indicates the station that is a next receiver in a case where a station transmits data to a destination station.

For example, when station 1 is a source device and station 2 is a destination device, the value of the above table indicates "2" (described in the first row). Therefore, station 1 transmits data to station 2 according to the table. In this case, the communication from station 1 to station 2 is performed by direct connection. Similarly, when station 1 is a source device, a communication is performed by direct connection even though a destination device is any of stations 3 to 5.

On the other hand, when station 2 is a source device and station 3 is a destination device, the value of the table indicates "4" (described in the second row). Therefore, station 2 transmits data, destined for station 3, to station 4. In this case, station 4 is provided as a relay station. Accordingly, the communication from station 2 to station 3 is performed by relay connection.

Referring to the relay route table shown in FIG. 4, when station 4 is a source device and receives data destined for station 3, a station ID "3" is described as a next receiver. Therefore, when station 2 transmits data to station 3, data is once delivered to station 4 (that is, a relay station) and transferred to station 3, according to the table.

It is to be noted that FIG. 4 shows an example of a relay route table during the course of generation of a session. In the course of generating a relay route table, there may be a pair of stations that cannot establish any communication route for some reason (such as incompatibility of routers) in a session. In FIG. 4, the value "X" is described with regard to such stations. Such a station, such as station 5, may establish a communication route by participating of a new station. However, if a station cannot establish a communication route to any other station, the station cannot participate in a session. Therefore, such a station is excluded from the session and a value such as "X" is not shown in an actual relay route table.

For smoother communication during a session, a master generates a relay route table according to one or more restrictions. Specifically, a restriction can be a restriction on a relay value, a RTT (round-trip time), or a data amount per station. Such restrictions may be set in accordance with a running game (that is, a running application) or a total number of stations participating in a session.

A relay value represents the number of communication routes via which a relay station is able to relay data here. For example, the relay value of station 4 in FIG. 4 is "2," because it functions as a relay station in communication routes from station 2 to station 3 and from station 3 to station 2. In the present exemplary embodiment, as is clear from the above example, each relay value is counted even when an upstream communication route and a downstream communication route are the same route. A restriction on a relay value corresponds to an example of a "first restriction" of the present technique. A restriction on a relay value means, for example, restricting a relay value by a maximum. A relay number herein corresponds to the number of hops, which represents the number of relay stations along the communication route when data reaches a destination station from a source station. However, it is to be noted that a relay number is a value determined by adding one to the number of hops.

Next, a RTT represents a length of time required for a signal to travel from a source station to a destination station and back again. In the present exemplary embodiment, in a case where there are one or more relay stations between a source station and a destination station, a RTT is a total of RTTs between each station. A restriction on a RTT corresponds to an example of a "second restriction" of the present technique. A restriction on a RTT means, for example, restricting a RTT to a maximum value.

FIG. 5 is a block diagram showing a functional configuration of gaming device 100. When a predetermined program is executed by controller 110 of gaming device 100, functions of selecting unit 111, generating unit 112, distributing unit 113, updating unit 114, data processing unit 115, and executing unit 116 are provided.

Selecting unit 111 is a unit for selecting a communication route from a source station to a destination station. If there are plural communication routes to be selected, selecting unit 111 selects one appropriate communication route based on one or more predetermined restrictions (such as a restriction on a relay value). Selecting unit 111 selects communication routes with regard to each pair of stations having potential to connect during a session. Specifically, selecting unit 111 selects the communication routes by executing a route determination process as described below.

Generating unit 112 is a unit for generating a relay route table, which is collected route information. Generating unit 112 generates a relay route table based on a result of selection performed by selecting unit 111. Distributing unit 113 is a unit for distributing the relay route table generated by generating unit 112 to intended stations.

Updating unit 114 is a unit for updating a relay route table. At a predetermined timing, updating unit 114 updates a relay route table by controlling selecting unit 111 to re-select communication routes and controlling generating unit 112 to update a relay route table. The timing may be, for example, a timing of participation of a new station in a session, a timing of secession of a station from a session, and a timing of occurrence of a network problem. The timing may also be a timing depending on a running game, such as a timing of reduced traffic or a timing of changing of a scene.

Data processing unit 115 is a unit for processing data exchanged in a session. Data processing unit 115 controls transmission, receipt, and forwarding of data between other stations. When transmitting data, data processing unit 115 sets address information that specifies one or more destination stations.

FIG. 6 shows an example of address information of the present exemplary embodiment. In the present exemplary embodiment, address information is a bit string of 32 bits. Each bit of address information indicates a destination of data and its station ID. That is, if the n-th bit of address information is "1," a station whose station ID is "n" is specified as a destination station. This address information is used to specify plural stations as destinations. Here, the number of bits of address information is equivalent to the number of stations available in one session. Therefore, in the case of FIG. 6, up to 32 stations are able to participate in one session.

By using such address information, data processing unit 115 can reduce the volume of data when it transmits the same data content to plural destinations, thereby reducing the use of a communication band. For example, when a source station transmits the same data to a first station and a second station by using the first station as a relay station, the source station does not have to transmit the data individually.

When receiving data from another station, data processing unit 115 refers to address information and executes a processing according to address information. For example, if address information is that of the device receiving it, data processing unit 115 processes the data as self-addressed data, or if address information specifies a station other than the device receiving it, data processing unit 115 transfers the data to the station. Moreover, if address information specifies the device receiving it and another device, data processing unit 115 processes the data as self-addressed data, and transfers the data to the station after eliminating a specification of itself from the address information. Data processing unit 115 refers to a relay route table and executes such a processing according to the relay route table.

Executing unit 116 is a unit for executing an application program. The application program herein is, in the present exemplary embodiment, the game program. Executing unit 116 is able to execute plural game programs selectively. Executing unit 116 is also able to perform a processing according to data received from a station that is executing the same game program, and to generate data to be transmitted to the station.

It is to be noted that selecting unit 111, generating unit 112, distributing unit 113, and updating unit 114 function when gaming device 100 is a master. On the other hand, data processing unit 115 and executing unit 116 function whether gaming device 100 is a master or a client.

According to the present exemplary embodiment, there is only one master in a session. The station that becomes the master is, for example, the station that initiates the session. The master can be replaced during a session such as in a case that the master secedes from the session. When the master is replaced, the station that can be connected with the most stations by direct connection or that has the lowest average RTT to each station is preferable as the next master.

A master distributes a relay route table to stations participating in the session. At that time, the master requires each client to measure and notify the RTT in order to generate (or update) the relay route table. In this case, the master and clients execute the process as follows.

Figure 7:
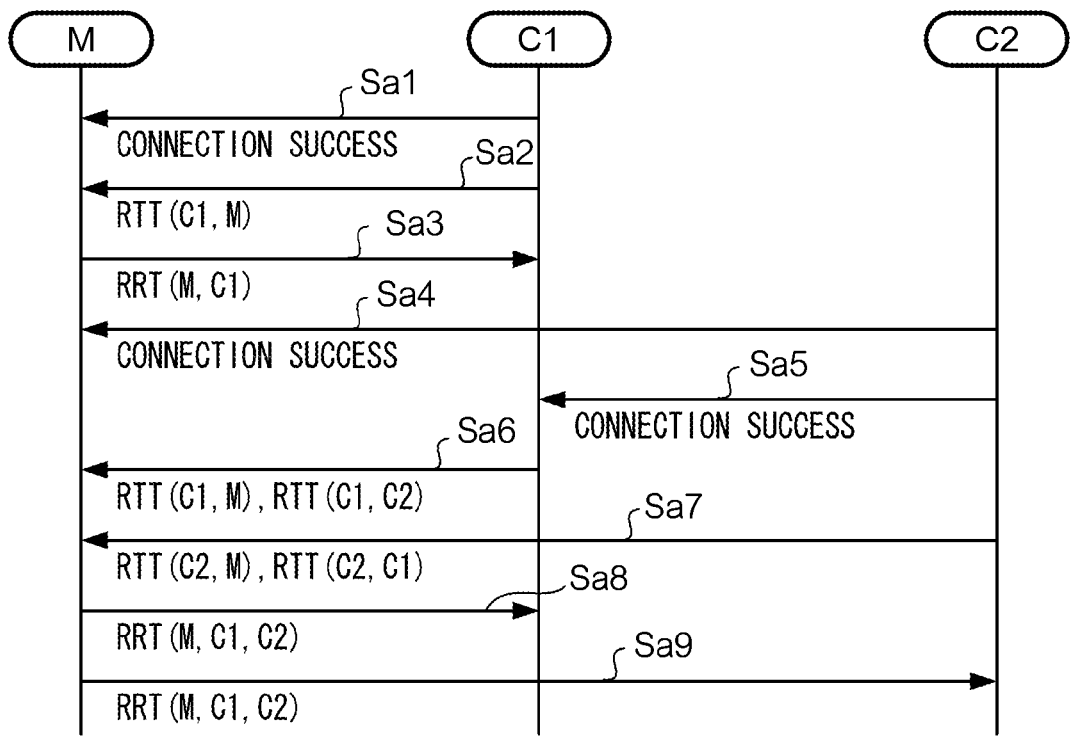
FIG. 7 is a sequence chart showing an example of a non-limiting operation of a master and clients for distribution of a relay route table.
Figure 8:
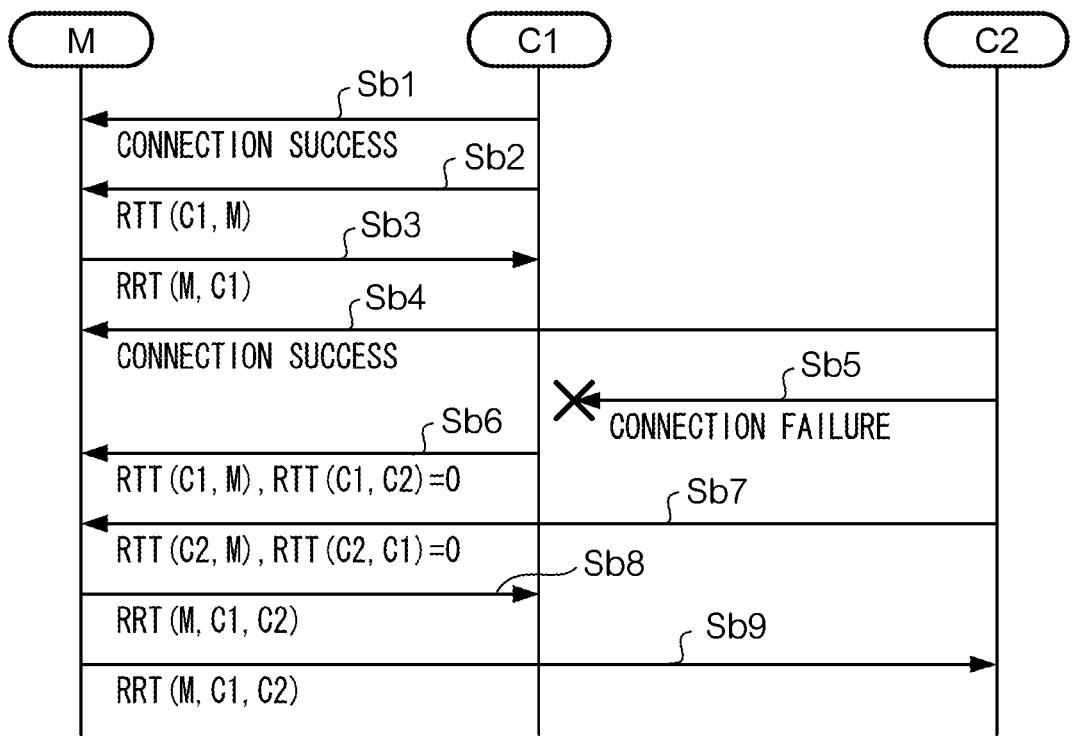
FIG. 8 is a sequence chart showing another example of a non-limiting operation for distribution of a relay route table.

FIGS. 7 and 8 are sequence charts showing operations of a master and clients to distribute a relay route table. FIG. 7 shows an operation in the case where two clients (referred to hereinafter as "client C1" and "client C2") connect to the master (referred to hereinafter as "master M") in sequence to participate in a session.

First, when successfully establishing a connection with master M (step Sa1), client C1 measures a RTT between client C1 and master M and transmits its value to master M (step Sa2). In FIG. 7, "RTT(a,b)" means the RTT between "a" and "b" measured by "a." Therefore, the RTT transmitted in step Sa2 (that is, "RTT(C1 M)") is the RTT between client C1 and master M measured by client C1.

When received the RTT from client C1, master M transmits a relay route table (RRT) to client C1 (step Sa3). In FIG. 7, "RRT(a,b)" means the relay route table including route information of "a" and "b." Therefore, the relay route table transmitted in step Sa3 (that is, "RRT(M,C1)") is the relay route table including route information of master M and client C1.

It is to be noted that there are only master M and client C1 in the session at this time. Accordingly, the relay route table indicates only direct connection between master M and client C1.

Here, it is assumed that client C2 participates in the session. Namely, client C2 successfully establishes a connection with master M (step Sa4.) In addition, client C2 tries to connect to client C1 and it is assumed that client C2 successfully establishes a connection with client C1 (step Sa5). At this time, client C1 transmits the RTT between clients C1 and C2 and the latest RTT between client C1 and master M at that time to master M (step Sa6). In step Sa6, client C1 may measure the RTT between client C1 and master M periodically and transmit the latest RTT; however, it may measure the RTT in response to the connection of client C2 and transmit the measured RTT. Client C2 measures the RTT between client C2 and master M and the RTT between clients C2 and C1, and transmits them to master M (step Sa7).

As described above, each client tries to connect to each participating station (including the master) each time a new station participates in the session, and measures RTTs when connections are established. In addition, the client transmits the measured RTT. This enables the master to receive the latest value of a RTT successively and to generate a relay route table in accordance with the latest network status in comparison with a case where the master does not update the values of RTTs of communication routes whose values of RTTs are already received.

After receiving a RTT from each client in the session (in this case, clients C1 and C2), master M updates the above relay route table based on the received RTTs and transmits it to clients C1 and C2 (step Sa8, Sa9). When performing these steps, master M adds route information on client C2 to the relay route table. In addition, master M updates route information on client C1 when needed.

On the other hand, FIG. 8 shows an operation performed when direct connection between clients fails. In the operation shown in FIG. 8, steps Sb1 to Sb4 are the same as steps Sa1 to Sa4 in FIG. 7. Therefore, explanation thereof is omitted here.

In step Sb5, it is assumed that client C2 fails to connect to client C1. When so, clients C1 and C2 transmit the value "0" as the RTT of each other (step Sb6, Sb7). Here, a value of "0" of a RTT means that a connection could not be established between stations, that is, the RTT is unmeasurable. However, the value of the RTT is not necessarily "0" as long as it indicates being unmeasurable.

After receiving a RTT from each client, master M updates the relay route table and transmits to each client (step Sb8, Sb9). In this case, master M recognizes that clients C1 and C2 cannot be connected directly based on the received RTTs. Specifically, if the RTTs received from two clients represent a predetermined value (in the above example, "0"), master M recognizes that these clients cannot be connected directly. Then master M selects another available communication route. In the case shown in FIG. 8, master M selects the communication route using itself as a relay station, that is, the communication route from client C1 to client C2 via master M (and the reverse route). Master M records the selected route as route information.

The operation of a master and clients is performed in the same way after a third or later client connects to the master. Namely, a client tries to connect to other stations (the master and clients) during the session and measures RTTs, and then receives the relay route table from the master. The master updates the relay route table each time it receives a RTT. The master successively updates the relay route table by repeating such an operation.

It is to be noted that explanation referring to FIGS. 7 and 8 is schematic and does not explain an actual processing entirely. There may be more clients to be connected during an actual session. Additionally, some clients may participate in or secede from the session before it ends. The master can select an appropriate communication route for each client by executing a route determination process, to be described below, when the configuration of the session has changed.

FIGS. 9 to 12 are flowcharts each showing an example of a route determination process. When the above communication control program is executed by controller 110 of gaming device 100 (the master), the route determination process is performed. This example shows the route determination process according to predetermined restrictions on the relay value and the RTT.

Figure 9:
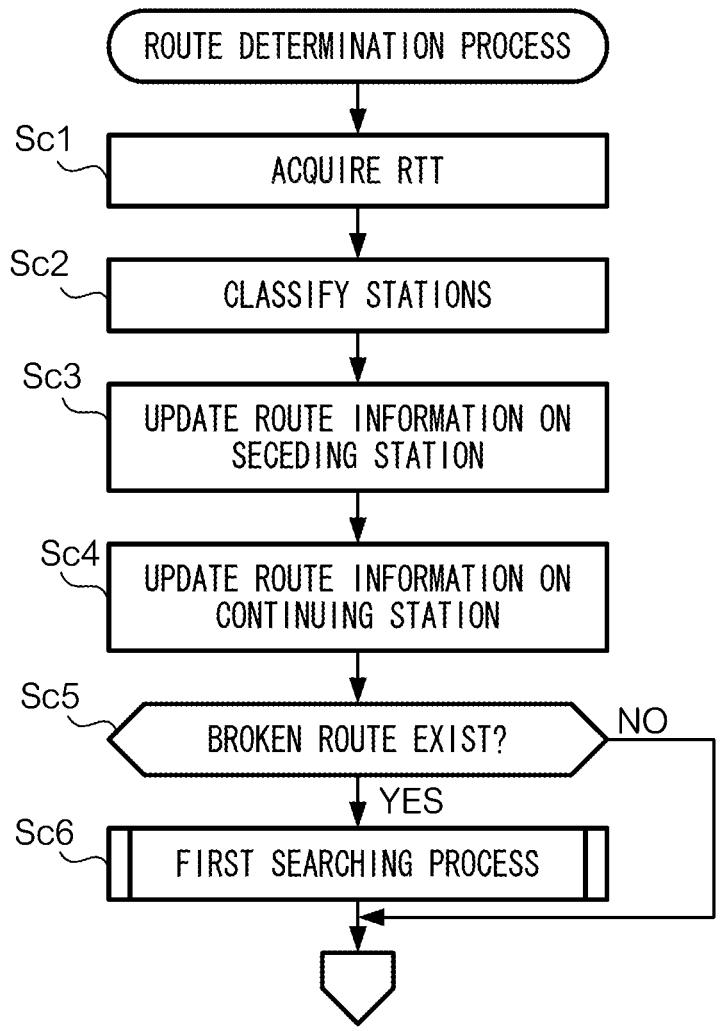
FIG. 9 is a flowchart showing an example of a non-limiting route determination process.

As shown in FIG. 9, controller 110 acquires RTTs between each station at the beginning (step Sc1). Controller 110 acquires not only RTTs between the master and clients but also RTTs between each pair of clients. The acquired RTTs include the value that represents an actual time and the predetermined value that represents a RTT is unmeasurable (such as "0"). Controller 110 classifies stations into a "new station," a "continuing station," and a "seceding station" (step Sc2).

A new station is a station that newly participates in the session. Accordingly, a new station is a station that has not participated in the session earlier and whose route information is not generated. Controller 110 determines whether a station is a new station based on information acquired in the previous route determination process such as RTTs. For example, a station whose RTT is acquired in the current route determination process but was not acquired by the previous route determination process corresponds to a new station.

A continuing station is a station that has continually participated in the session. For example, a station whose RTT is acquired by both the current route determination process and the previous route determination process corresponds to a continuing station.

A seceding station is a station that secedes from the session. For example, a station whose RTT was acquired by the previous route determination process but is not acquired in the current route determination process corresponds to a seceding station.

After classifying stations, controller 110 updates route information on seceding stations (step Sc3). Controller 110 identifies communication routes whose source or destination is a seceding station as unconnectable routes. An unconnectable route herein is a communication route that cannot establish a connection. Additionally, controller 110 identifies communication routes that include a relay station that is a seceding station as broken routes.

Next, controller 110 updates route information on continuing stations (step Sc4). Controller 110 identifies communication routes between continuing stations which lost connection as broken routes. Broken routes may include a communication route by direct connection or by relay connection.

Controller 110 determines whether there is any broken route in the session (step Sc5). In other words, controller 110 determines whether there is a communication route identified as a broken route in steps Sc3 and Sc4. If there is a broken route, controller 110 executes the first searching process described below (step Sc6). Alternatively, if there is not any broken route, controller 110 skips the first searching process.

Figure 10:
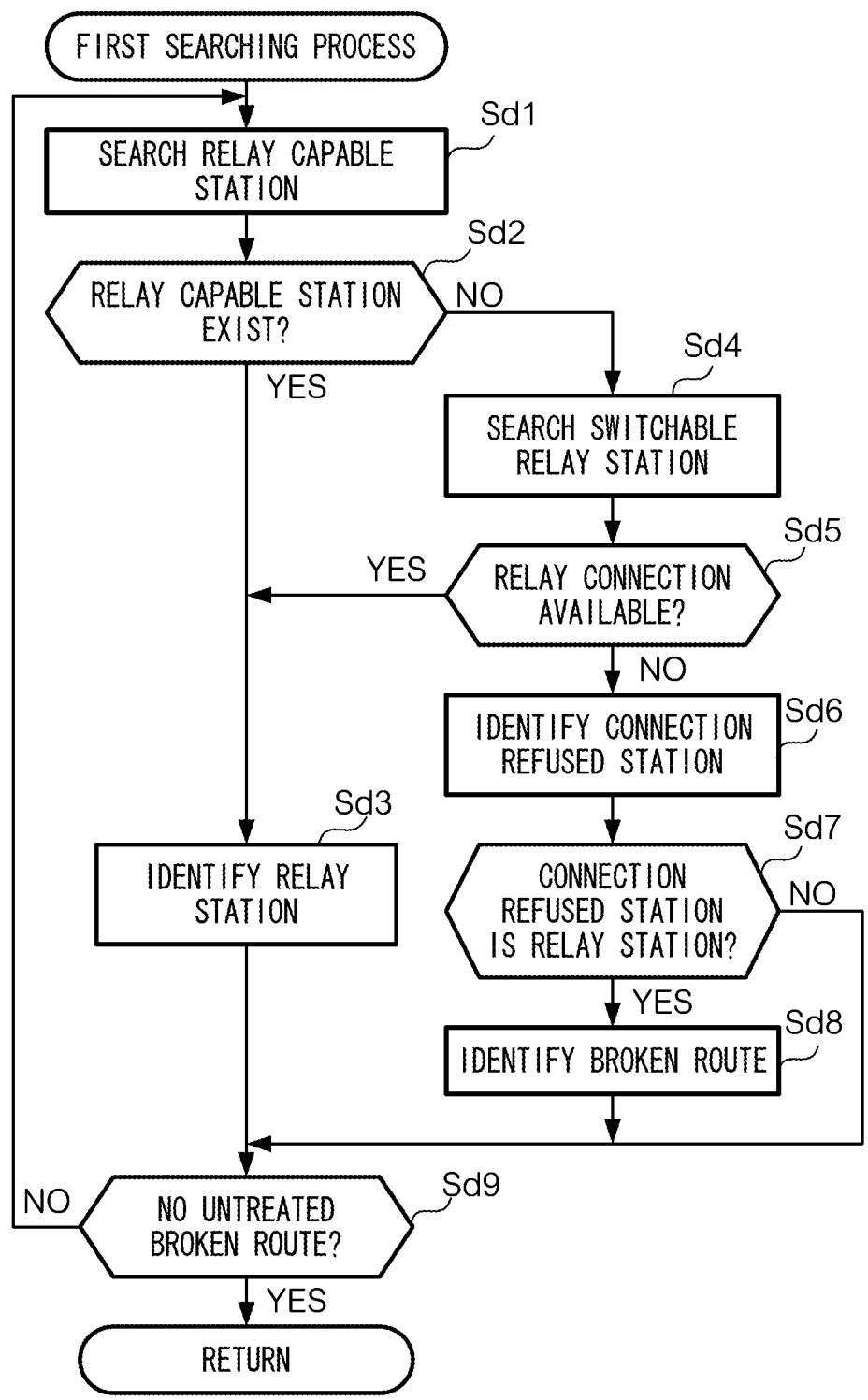
FIG. 10 is a flowchart showing an example of a non-limiting first searching process.

FIG. 10 is a flowchart showing the first searching process. In this process, controller 110 searches a station which is able to relay data between stations whose communication route is a broken route (step Sd1). Controller 110 executes the processing of step Sd1 from the station having the fewest links to a broken route.

Controller 110 determines whether there is a station which is able to relay data (step Sd2). Hereinafter, such a station will be referred to as a "relay capable station." A relay capable station is able not only to relay, but also to fulfill the above restrictions on the relay value and the RTT. Therefore, if the relay value of a station indicates its maximum, controller 110 determines that the relay connection via the station is unavailable even though the station has links to the source and the destination.

If there is a relay capable station, controller 110 identifies the station as a relay station (step Sd3). By using the above relay station, controller 110 establishes the communication route between stations whose communication route was a broken route.

On the other hand, if there is not a relay capable station, controller 110 searches a switchable relay station (step Sd4). That is, controller 110 determines whether stations whose communication route was a broken route can be connected via a relay station by switching any of existing relay stations.

Here, switching of a relay station means changing a relay station of a communication route which is already established by relay connection into another relay station. Such switching has a possibility of establishing a communication route that was a broken route by using other links.

Figure 13:
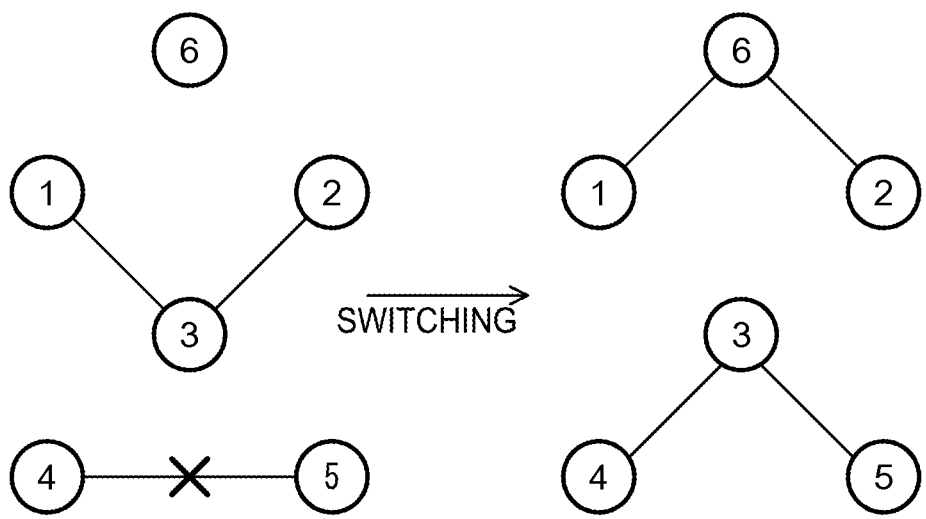
FIG. 13 shows an example of a non-limiting switching of a relay station.

FIG. 13 shows an example of a switching of a relay station. In this example, the communication route between stations 1 and 2 is a relay connection via station 3, and the communication route between stations 4 and 5 is a broken route. It is to be noted that there may be more links than are shown in the figure. Additionally, the restriction on the relay value in this example is that the maximum of the relay value is "2." Moreover, it is assumed that station 3 can directly connect to stations 4 and 5, and station 6 can directly connect to stations 1 and 2.

Here, the relay value of station 3 is "2," since there are communication routes from station 1 to station 2 and vice versa. That is, the relay value of station 3 reaches its maximum. Therefore, station 3 cannot function as a relay station of other communication route as it is. Then stations 4 and 5 cannot establish a communication route via station 3, even though they can directly connect to station 3.

At this time, if the relay station between stations 1 and 2 changes to station 6, the relay value of station 3 decreases from "2" to "0." Accordingly, station 3 can be a relay station of other communication routes. Then stations 4 and 5 become able to establish the communication route by relay connection via station 3.

Controller 110 searches such a switchable relay station in step Sd4, and tries to establish a communication route between stations whose communication route is a broken route. Then, controller 110 determines whether relay connection between stations whose communication route is a broken route is available by switching a relay station (step Sd5). If there is a relay capable station, controller 110 identifies the station as a relay station (step Sd3).

In a case where relay connection between stations whose communication route is a broken route does not become possible in step Sd5, controller 110 identifies one of these stations (a source station and a destination station) as a "connection refused station" (step Sd6). For example, controller 110 compares the number of links that are broken routes between the source station and the destination station, and identifies the station having the higher relay value as a connection refused station.

Next, controller 110 determines whether the connection refused station is a relay station of any communication routes (step Sd7). If the connection refused station is a relay station, controller 110 identifies each link included in communication routes that are relayed by the relay station as a broken route (step Sd8). On the other hand, if the connection refused station is not a relay station, controller 110 skips step Sd8.

Controller 110 determines whether steps Sd1 to Sd8 are executed for each broken route (step Sd9). If there is an untreated broken route, controller 110 executes steps Sd1 to Sd8 with regard to the untreated broken route. On the other hand, if there is not an untreated broken route, controller 110 finishes the first searching process.

Figure 11:
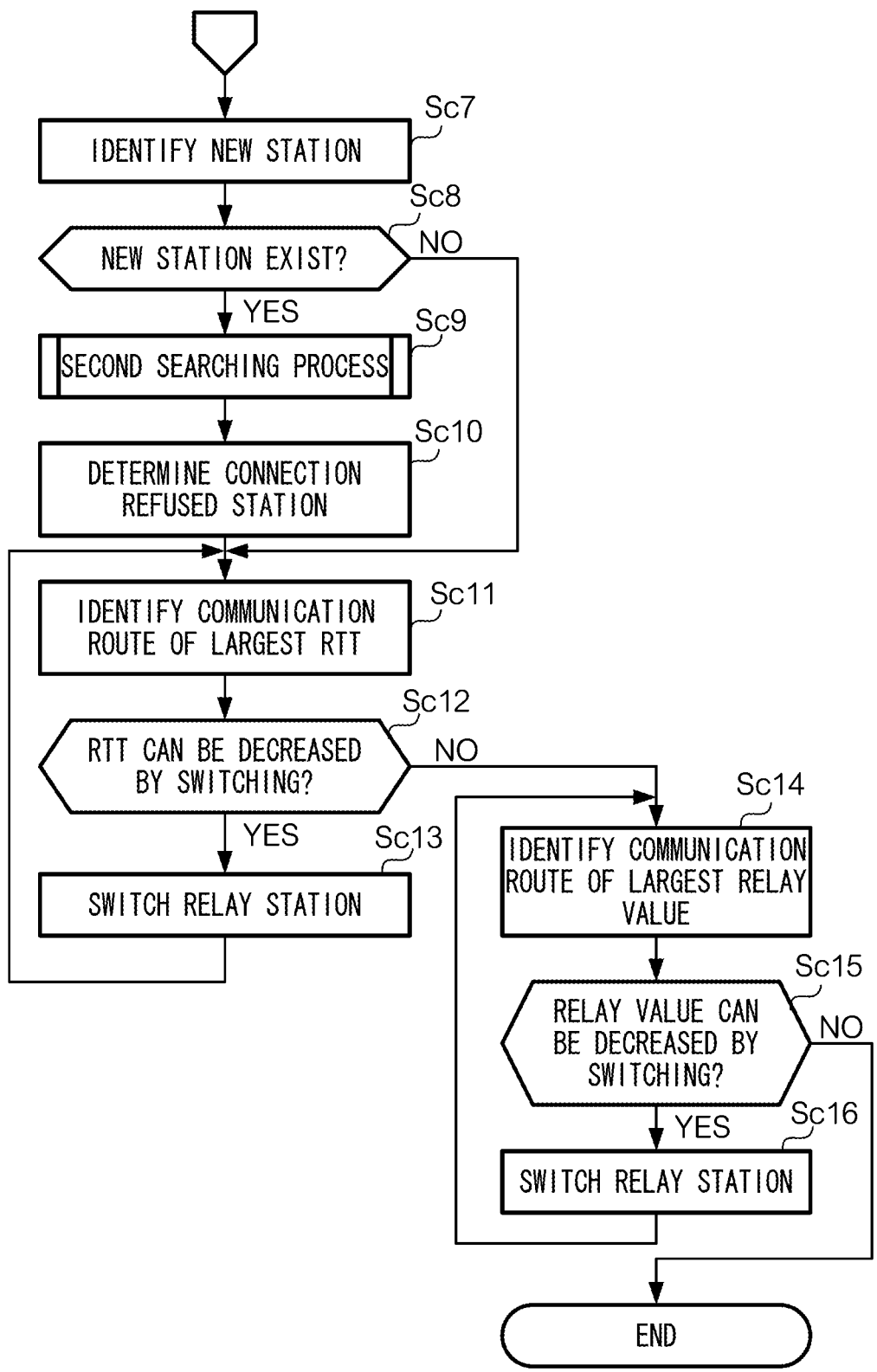
FIG. 11 is a flowchart showing an example of a non-limiting route determination process (sequel to FIG. 9).

FIG. 11 shows a flowchart of the route determination process after the first searching process. In step Sc7, controller 110 identifies each of the connection refused stations as one of the new stations. The new stations include the station classified in step Sc2 and identified in step Sc7. Controller 110 determines whether there is a new station (step Sc8) and, if so, executes a second searching process for each new station (step Sc9).

Figure 12:
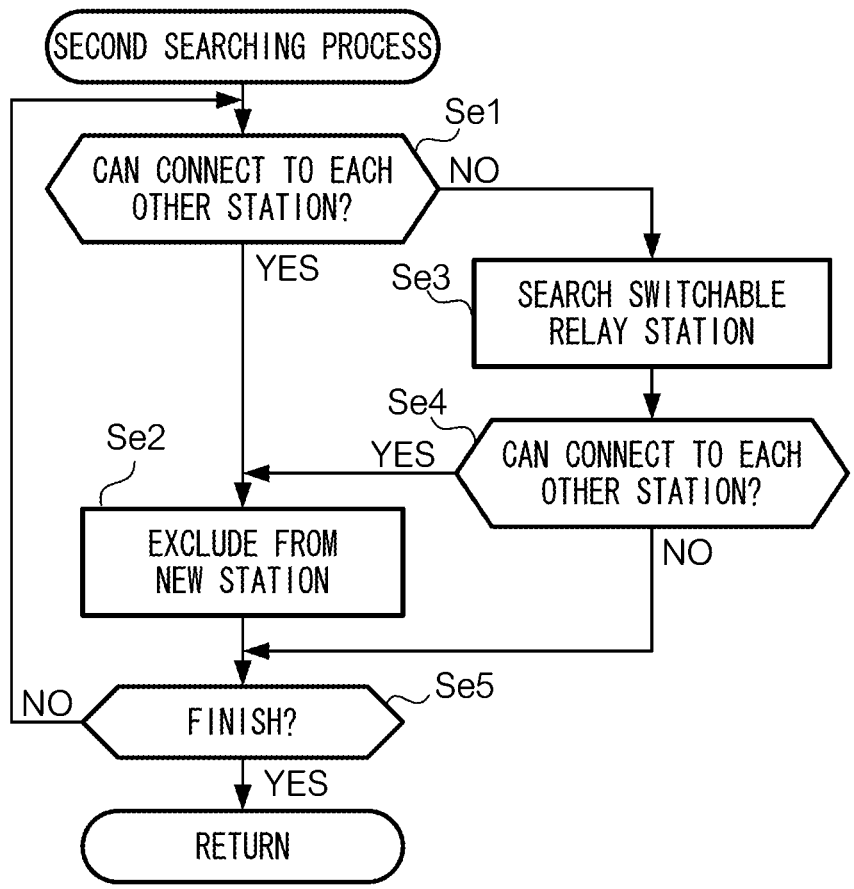
FIG. 12 is a flowchart showing an example of a non-limiting second searching process.

FIG. 12 is a flowchart showing the second searching process. By this process, controller 110 executes steps Se1 to Se4 for each new station. First, controller 110 determines whether a new station can connect to each other station in the session (step Se1). The connection herein may be either direct connection or relay connection. Controller 110 determines the connection for each continuing station and each station determined to be participating newly (described below).

If the new station can connect to each other station in the session, controller 110 excludes the station from the new stations, and determines that the station is determined to be a newly participating station (step Se2).

On the other hand, if the new station cannot connect to any other station in the session, controller 110 searches a switchable relay station (step Se3). Step Se3 is the same processing as step Sd4 in the first searching process. Namely, controller 110 determines whether stations whose communication route is a broken route can be connected via a relay station by switching any of existing relay stations.

Then, controller 110 determines whether the new station can connect to each other station in the session once again (step Se4). Step Se4 is the same processing as step Se1. If the new station can connect to each other station in the session, controller 110 eliminates that station from the new stations and determines that the station is a station determined to be participating newly (step Se2). On the other hand, if the new station cannot connect to any other station in the session, controller 110 skips step Se2.

After that, controller 110 determines whether the running process has ended (step Se5). If there is an untreated new station, controller 110 executes steps Se1 to Se4 with regard to the new station. Moreover, when there is a new station for which steps Se1 to Se4 are executed and which is not eliminated from the new stations (that is, a new station which is made a negative determination in step Se4), and another new station determined to participate newly, controller 110 executes step Se1 to Se4 with regard to the new station. This is because the other new station creates the possibility for establishing a communication route.

When the second searching process is completed, controller 110 determines the new stations (that is, stations not determined to be participating newly) as connection refused stations (step Sc10). Controller 110 rejects participation of such stations in the session. Such a station announces to its user the game is not playable by displaying a predetermined message such as "cannot access a network."

The communication route of each station which can participate in the session is determined at that time. Therefore, controller 110 may finish the route determination process and generate a relay route table at this time. On the other hand, controller 110 can avoid conflicting restrictions on the relay value or the RTT in the succeeding route determination process by executing the following process. Accordingly, controller 110 may execute optional steps Sc11 to Sc16 as needed.

In step Sc11, controller 110 identifies the communication route whose RTT is the largest in the session. It is to be noted that this largest RTT does not necessarily correspond to the above maximum. Next, controller 110 determines whether the largest RTT can be decreased by switching a relay station (step Sc12). The switching herein corresponds to that of the first or second searching process.

If the largest RTT can be decreased by switching a relay station, controller 110 switches a relay station so that the largest RTT can be decreased (step Sc13). Namely, controller 110 changes a communication route of a certain pair of stations to another route. In other words, controller 110 reselects a relay station.

When the value of RTT is decreased by execution of step Sc13, the largest RTT in the session changes. As a result, the communication route whose RTT is the largest in the session may be different from one in the past. Therefore, controller 110 executes step Sc11 again after executing step Sc13 and, if possible, changes a relay station again. Controller 110 repeats these steps until it cannot switch a relay station because of the restriction on the relay value etc.

When a negative determination is made in step Sc12, controller 110 identifies the communication route whose relay value is the largest in the session (step Sc14). As in step Sc11, this largest relay value does not necessarily correspond to the above maximum.

Controller 110 determines whether the largest relay value can be decreased by switching a relay station (step Sc15). Controller 110 switches a relay station so that the largest relay value can be decreased (step Sc16), if possible. Controller 110 repeats these steps until it cannot switch a relay station, as in the case of the RTT (steps Sc11 to Sc13).

Steps Sc11 to Sc13 are processes to decrease the largest RTT in the session, and steps Sc14 to Sc16 are processes to decrease the largest relay value in the session. Controller 110 may execute only one of these processes. Controller 110 may also transpose the execution order of these processes.

By executing the above route determination process, the master can select an appropriate communication route in accordance with restriction on the RTT and the relay value with regard to each station in the session. The master generates the relay route table based on the result of the route determination process, and distributes it to each station (client).

FIGS. 14 to 17 show an example of the change of a session and a relay route table. This example is based on the network configuration shown in FIG. 3 and the relay route table shown in FIG. 4. It is assumed that station 6 participates in the session and then station 4 secedes from the session in the example. It is also assumed that the maximum of the relay value is restricted to "2" and the maximum of the RTT is restricted to "100 (msec)." Namely, the relay value of each station must not be larger than 2 and the RTT of each pair of stations must not be longer than 100 msec. Each RTT of links is shown on each link in FIGS. 14, 15, and 17.

Figure 14:
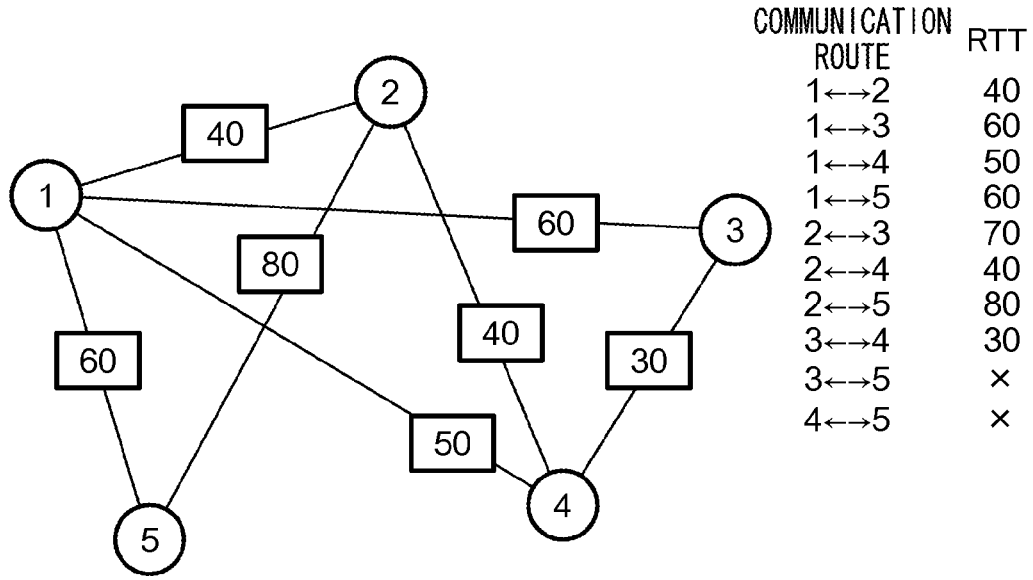
FIG. 14 shows an example of a non-limiting change of a session made by executing the route determination process.

As shown in FIG. 14, when communication routes are selected according to the relay route table shown in FIG. 4, the RTTs of each communication route do not exceed 100. In addition, the relay values of stations 1, 2, 3, and 5 are "0" and station 4 is "2."

Figure 15:
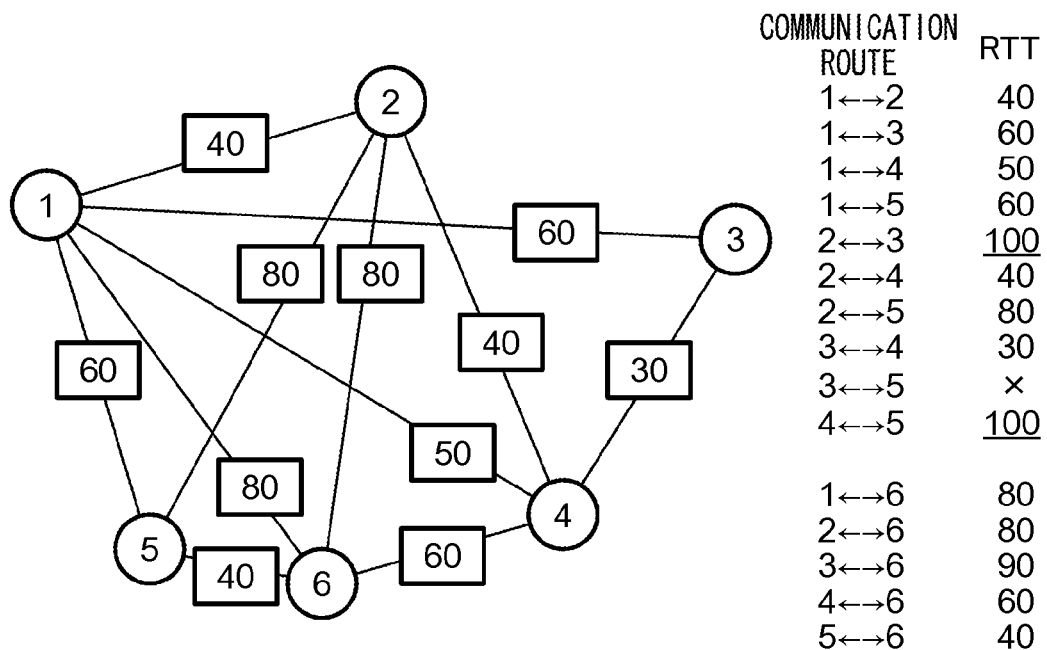
FIG. 15 shows an example of a non-limiting change of a session made by executing the route determination process.

If station 6 newly participates in the session as shown in FIG. 15, station 6 can directly connect to each station except station 3. In addition, if station 6 relays data via station 4, it can establish a communication route with station 3 while fulfilling the restriction on the RTT. However, if the relay value of station 4 is "2," that is the maximum, station 6 cannot establish relay connection to station 3 at this rate.

Here, focusing on connection between stations 2 and 3, not only station 4 but also station 1 can be a relay station. In such a case, the master changes the relay station between stations 2 and 3 to station 1. As a result, station 4 can function as the relay station between stations 3 and 6, since its relay value decreases from "2" to "0."

In addition, by participation of station 6 as a new station in the session, stations 4 and 5 become able to establish the communication route via station 6 as a relay station.

Accordingly, the communication routes between stations 2 and 3 and stations 4 and 5 change as a result of participation of station 6 in the session. Specifically, as underlined in FIG. 15, the RTT between stations 2 and 3 changes "70" into "100" and stations 4 and 5 become able to establish a communication route while fulfilling the restrictions on the relay value and the RTT.

Figures 16, 17, 18:
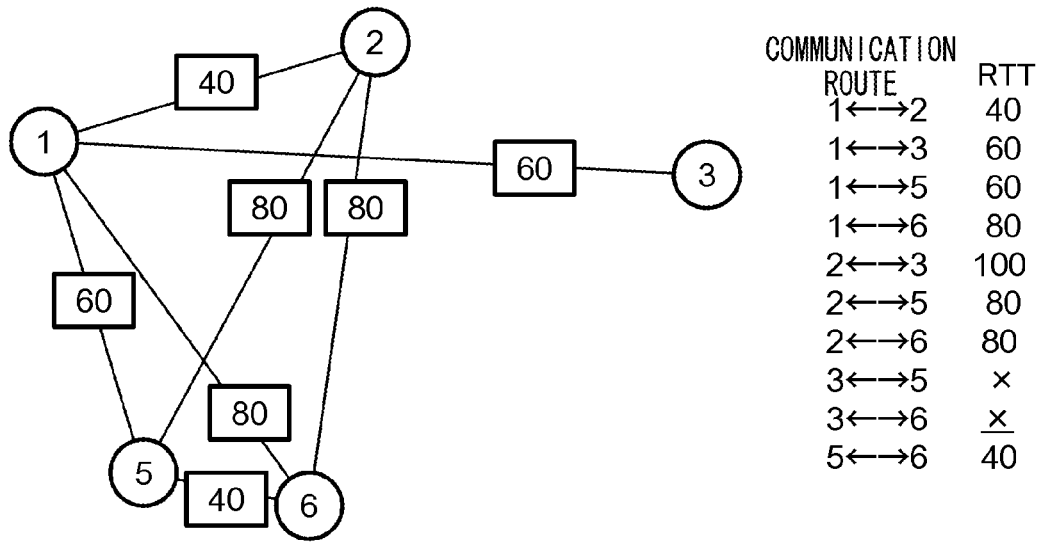
FIG. 16 shows an example of a non-limiting change of the relay route table made by executing the route determination process.
FIG. 17 shows an example of a non-limiting change of the session made by executing the route determination process.
FIG. 18 shows an example of a non-limiting change of the relay route table made by executing the route determination process.

FIG. 16 shows the relay route table which the master generates (updates) after participation of station 6 in the session. This relay route table is different from the one shown in FIG. 4 in that route information on station 6 is added and underlined station IDs are changed.

Here, it is assumed that station 4 secedes from the session after participation of station 6 in the session. Namely, station 4 corresponds to the seceding station. The network configuration at this time is shown in FIG. 17. When station 4 secedes from the session, the communication route whose source or destination is station 4 becomes the unconnectable route, and the communication route relayed by station 4 (that is, the communication route between stations 3 and 6) becomes a broken route.

In this example, stations 3 and 6 cannot connect directly. Additionally, stations 3 and 6 cannot establish relay connection, since the total RTT of each communication route is at least "140," which exceeds the restriction. In this case, the master updates route information on station 4 and identifies the communication route between station 3 and 6 as an unconnectable route.

FIG. 18 shows the relay route table which the master generates (updates) after secession of station 4. This relay route table is different from the one shown in FIG. 16 in that route information on station 6 is deleted and underlined station IDs are changed.

As described in the foregoing, according to the present exemplary embodiment, it is possible for plural stations (gaming devices 100) to establish connections with each other in compliance with the restrictions on the relay value and the RTT. Therefore, according to the present exemplary embodiment, it is possible to suppress the occurrence of a bottleneck in the mesh-type network by overloading of the specific station because of the excess of the relay value, or by the localization of the communication route of the larger RTT. Accordingly, it is possible to suppress deterioration in the total quality of the mesh-type network according to the present exemplary embodiment. In addition, according to the present exemplary embodiment, a load or a delay becomes less obvious for the averaging of the relay value and the RTT of each communication route. These characteristics provide remarkable effects especially in the case of executing a game that is played by plural users (for example, 5 users or more) at one time or that requires high communication frequency and fast response.

In addition, any station constituting the mesh-type network can be a relay station in the present exemplary embodiment. Each station not only exchanges data, but also executes the program for playing a game which is played by plural users at one time. In this situation, if the specific station gains the excessive relay value and becomes more overloaded than other stations, the load may interfere with the playing of the game. However, communication system 10 is configured to avoid concentration of function of a specific station as a relay station by setting the restriction on the relay value, which can prevent a diminished user experience.

Moreover, in the present exemplary embodiment, it is possible for address information to specify plural stations as destinations. Such data enables stations to reduce their loads, especially stations whose relay values are relatively large. This load reduction leads to load distribution for each station.

Second Exemplary Embodiment

FIG. 19 is a block diagram showing a configuration of communication system 20 according to another exemplary embodiment. Communication system 20 is a configuration common to communication system 10 in the above first exemplary embodiment except for inclusion of relay server 300. In the present exemplary embodiment, components denoted by the same reference numerals as in the first exemplary embodiment correspond to components explained in the first exemplary embodiment.

Relay server 300 is a computer device capable of communicating with gaming devices 100 and functioning as a relay station. Relay server 300 has a general configuration and function as a server device such as a unit for controlling operations of components of relay server 300 and a unit for exchanging data. Unlike gaming device 100, relay server 300 is a dedicated device for relay connection. Therefore, relay server 300 does not execute the game program. In addition, relay server 300 preferably has high ability of processing and an enough communication band in comparison to gaming devices 100. Relay server 300 is one example of a relay device of the present technique. It is to be noted that the relay device of the present technique is not necessarily a server device.

Relay server 300 functions as a node in the mesh-type network. For example, in a case where there are stations that cannot establish a communication route, the master uses relay server 300 as a relay station between these stations. Relay server 300 may be used as a relay station regardless of whether communication routes between stations are available without relay server 300.

FIG. 20 shows an example of a network configuration including relay server 300. This network configuration is like the configuration shown in FIG. 17, except that the node of relay server 300 (R) is added. In the example shown in FIG. 17, communication routes between stations 3 and 5 and stations 3 and 6 cannot be established. However, in the example shown in FIG. 20, these communication routes become able to be established by use of relay server 300 as a relay station.

FIG. 21 shows the relay route table in this case. This relay route table includes the values indicative of relay server 300 (described as "R" here) which are indicative of unconnectable (X) in FIG. 18. According to this relay route table, station 3 transmits data destined for station 5 (or 6) to relay server 300.

As described in the foregoing, according to the present exemplary embodiment, it is possible to reduce unconnectable routes or reduce loads of stations by relaying data by using relay server 300, in comparison with a case where relay server 300 is not used (such as in the case of the first exemplary embodiment).

2. Modification

The above exemplary embodiments are examples of an embodiment of the present technique. The present technique may be implemented in embodiments shown by the following modifications, in addition to the above exemplary embodiments. The following modifications may be combined with each other.

(Modification 1)

When there are plural communication routes to be selected, selecting unit 111 can select one in various ways. For example, when there are plural communication routes to be selected, selecting unit 111 may preferentially select a communication route having the smallest RTT. Also, when there are plural communication routes that include one by direct connection and one by relay connection to be selected, selecting unit 111 can preferentially select the communication route by direct connection. Alternatively, selecting unit 111 selects a communication route so that the relay values in the session become as equal as possible.

(Modification 2)

Distributing unit 113 may distribute not a whole of the relay route table but only a part of the relay route table. A minimum of route information to be distributed to a certain station is that it represents station IDs in a case where the certain station is a source device and each other station is a destination device. For example, in a case of the relay route table shown in FIG. 4, station 1 can identify any receiver device as long as it has route information described in the first row of the table, regardless of which station is a destination device.

On the other hand, if distributing unit 113 distributes a whole of the relay route table, each station can hold the same data. Thereby, if a case arises where the master secedes from the session and one of the stations (clients) becomes the new master, the new master easily identifies prior route information (that is, the relay route table generated by the seceded master). As a result, it is possible for the new master to perform the classification in step Sc2 easily.

(Modification 3)

The mesh-type network in the present technique may be a fully connected network. A fully connected network herein is a communication network in which the nodes are directly connected to each other. The mesh-type network may include a node that is not directly connected to any other of the nodes.

(Modification 4)

According to the present technique, any station can be the master; however, it may be that only the stations that fulfill a predetermined condition may be the master. For example, to be the master, it may be required that a station has above a certain level of performance above a certain level of performance such as processing ability. Also, it may be required that a relay station fulfill a predetermined condition. By these conditions, it is possible to suppress the load on a station having lower performance, in a case where there are differences in performance of the stations.

(Modification 5)

A device (communication device) according to the present technique is not limited to a gaming device. For example, a device according to the present technique may be a personal computer, a tablet computer, or a smartphone. A device according to the present technique is not limited as long as it exchanges data by performing communication with other devices and executes a predetermined application.

Additionally, the application herein is not necessarily a game. The application executed in the present technique may be an application that exchanges data (including voice, still image, moving image, and combination thereof) with other devices, regardless of whether it is a game. For example, an application according to the present technique may be an application for editing an image or a document collaboratively with plural users, or an application for exchanging sounds and/or images with plural users such as what is known as a video phone.

(Modification 6)

A communication device according to the present technique may be a device for selecting a communication route according to at least one of the restrictions on the relay value and the RTT.

Namely, the present technique may also provide a communication system, including: a plurality of devices that form a mesh-type network, each of the plurality of devices performing communication from a source device to a destination device, directly or by relaying via one or more other devices, and at least one of the plurality of devices including a selecting unit, that selects a communication route from the source device to the destination device according to at least one restriction including a first restriction with regard to a relay value indicative of the number of communication routes that each device is able to relay and a second restriction with regard to a RTT between the source device and the destination device.

Additionally, the present technique may also provide a communication system, including: a plurality of devices that form a mesh-type network, each of the plurality of devices performing communication from a source device to a destination device, directly or by relaying via one or more other devices, and at least one of the plurality of devices including a selecting unit, that selects a communication route from the source device to the destination device according to a restriction with regard to a RTT between the source device and the destination device.

Moreover, the present technique may also provide a communication system, including: a plurality of devices that form a mesh-type network, each of the plurality of devices performing communication from a source device to a destination device, directly or by relaying via one or more other devices, and at least one of the plurality of devices including a data processing unit, that transmits a piece of data by setting address information that specifies a plurality of the destination device.

(Modification 7)

The present technique can provide not only a communication system, but also a communication device, a communication method, and so on. Moreover, the present technique can provide a program to realize the function of gaming device 100. The program may be provided to an information-processing device in the form of a storage medium such as an optical disk or a semiconductor memory. Alternatively, the program may be downloaded to a communication device via a network such as the Internet.

What is claimed is:

1. A communication system, comprising:
   a plurality of devices that form a mesh-type network,
   each of the plurality of devices performing communication from a source device to a destination device, directly or by relaying via one or more other devices, and
   at least one of the plurality of devices including a selector, that selects a communication route from the source device to the destination device according to a first restriction with regard to a relay value indicative of the number of communication routes from the source device to the destination device and vice versa that each device is able to relay,
   wherein the selector selects the communication route according to the first restriction and a second restriction with regard to a RTT (round-trip time) between the source device and the destination device.

2. The communication system according to claim 1, wherein:
   the first restriction represents a maximum of the relay value; and
   the selector selects the communication route with regard to the one or more other devices so that each of the relay values of the one or more other devices is not larger than the maximum.

3. The communication system according to claim 1, wherein the selector re-selects the communication route of one of the one or more other devices, the relay value of which is the largest among the one or more other devices, so that the relay value decreases.

4. The communication system according to claim 1, wherein:
the second restriction represents a maximum of the RTT; and
the selector selects the communication route with regard to a pair of the source device and the destination device so that the RTT of the pair is not larger than the maximum.

5. The communication system according to claim 4, wherein the selector re-selects the communication route of the pair so that the RTT of the pair decreases.

6. The communication system according to claim 1, wherein the selector preferentially selects, when a plurality of communication routes to be selected exists, the communication route having the smallest RTT of the plurality of the communication routes.

7. The communication system according to claim 1, wherein each of the plurality of devices includes a processor that executes an application based on received data.

8. The communication system according to claim 7, wherein:
the processor selectively executes one of a plurality of applications; and
the first restriction is set in accordance with the application executed by the processor.

9. The communication system according to claim 7, wherein:
the plurality of devices executes a single application by using the processor at one time; and
the destination device receives data transmitted from the source device by executing the application, and executes a processing according to the data.

10. The communication system according to claim 1, wherein each of the plurality of devices includes a data processor that transmits an item of data by setting address information that specifies a plurality of the destination device.

11. The communication system according to claim 10, wherein the data processor determines, when receiving the data for which the address information is set, the device specified by the address information, and if the address information specifies the device in which the data is received, processes the data as data destined for itself, or if the address information specifies another device, transfers the data to the device.

12. The communication system according to claim 11, wherein the data processor, if the address information specifies the device in which the data is received and another device, processes the data as data addressed to itself, and transfers the data to the device after eliminating a specification of itself from the address information.

13. The communication system according to claim 10, wherein the data processor transmits the data based on route information indicative of a next receiver device with respect to each of the destination devices.

14. The communication system according to claim 13, wherein the route information indicates the next receiver device with respect to one or more of the plurality of devices including the device which transmits data to the next receiver device.

15. The communication system according to claim 14, wherein the route information indicates the next receiver device with respect to all of the plurality of devices.

16. The communication system according to claim 13, wherein the at least one of the plurality of devices includes a generator that generates the route information in accordance with the first restriction, based on a result of selection by the selector.

17. The communication system according to claim 13, wherein:
the at least one of the plurality of devices includes a distributor that distributes the route information to intended devices; and
the intended devices transmit the data based on the route information distributed by the distributor.

18. The communication system according to claim 1, further comprising a relay device communicable with the plurality of devices and different from the plurality of devices.

19. The communication system according to claim 18, wherein the selector selects, if a communication route is not able to be established in accordance with the first restriction by using the plurality of devices, a communication route relayed by the relay device.

20. The communication system according to claim 1, wherein the mesh-type network is a P2P (peer to peer) network.

21. A communication device, comprising:
a processing system, including a processor, the processing system being at least configured to:
select a communication route from a source device to a destination device according to a first restriction with regard to a relay value indicative of the number of communication routes from the source device to the destination device and vice versa that each of a plurality of devices that form a mesh-type network and perform communication directly or by relaying via one or more other devices, is able to relay,
wherein the communication route is selected according to the first restriction and a second restriction with regard to a RTT (round-trip time) between the source device and the destination device.

22. A non-transitory storage medium storing a program for causing a computer to execute the step of:
selecting a communication route from a source device to a destination device according to a first restriction with regard to a relay value indicative of the number of communication routes from the source device to the destination device and vice versa that each of a plurality of devices that form a mesh-type network and perform communication directly or by relaying via one or more other devices, is able to relay,
wherein the communication route is selected according to the first restriction and a second restriction with regard to a RTT (round-trip time) between the source device and the destination device.

23. A communication method, comprising:
selecting a communication route from a source device to a destination device according to a first restriction with regard to a relay value indicative of the number of communication routes from the source device to the destination device and vice versa that each of a plurality of devices that form a mesh-type network and perform communication directly or by relaying via one or more other devices, is able to relay,
wherein the communication route is selected according to the first restriction and a second restriction with regard to a RTT (round-trip time) between the source device and the destination device.

24. A communication system, comprising:
a plurality of devices that form a mesh-type network, each of the plurality of devices performing communication from a source device to a destination device, directly or by relaying via one or more other devices, and at least one of the plurality of devices including a selector, that selects a communication route from the source device to the destination device according to a first restriction with regard to a relay value indicative of the number of communication routes from the source device to the destination device and vice versa that each device is able to relay, wherein:

each of the plurality of devices includes a processor that executes an application based on received data;

the processor selectively executes one of a plurality of applications; and the first restriction is set in accordance with the application executed by the processor.

25. A communication system, comprising:

a plurality of devices that form a mesh-type network, each of the plurality of devices performing communication from a source device to a destination device, directly or by relaying via one or more other devices, and at least one of the plurality of devices including a selector, that selects a communication route from the source device to the destination device according to a first restriction with regard to a relay value indicative of the number of communication routes from the source device to the destination device and vice versa that each device is able to relay, wherein:

each of the plurality of devices includes data processor that transmits an item of data by setting address information that specifies a plurality of the destination device;

the data processor determines, when receiving the data for which the address information is set, the device specified by the address information, and if the address information specifies the device in which the data is received, processes the data as data destined for itself, or if the address information specifies another device, transfers the data to the device; and the data processor, if the address information specifies the device in which the data is received and another device, processes the data as data addressed to itself, and transfers the data to the device after eliminating a specification of itself from the address information.

26. A communication system, comprising:

a plurality of devices that form a mesh-type network; each of the plurality of devices performing communication from a source device to a destination device, directly or by relaying via one or more other devices;

at least one of the plurality of devices including a selector, that selects a communication route from the source device to the destination device according to a first restriction with regard to a relay value indicative of the number of communication routes from the source device to the destination device and vice versa that each device is able to relay; and a relay device communicable with the plurality of devices and different from the plurality of devices;

wherein the selector selects, if a communication route is not able to be established in accordance with the first restriction by using the plurality of devices, a communication route relayed by the relay device.

* * * * *